C. W. HONABACH.
CONVEYER CHAIN.
APPLICATION FILED AUG. 21, 1909.
955,070.
Patented Apr. 12, 1910.
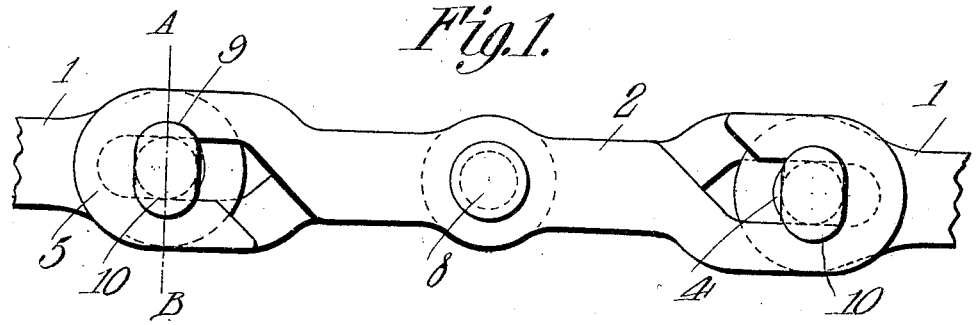
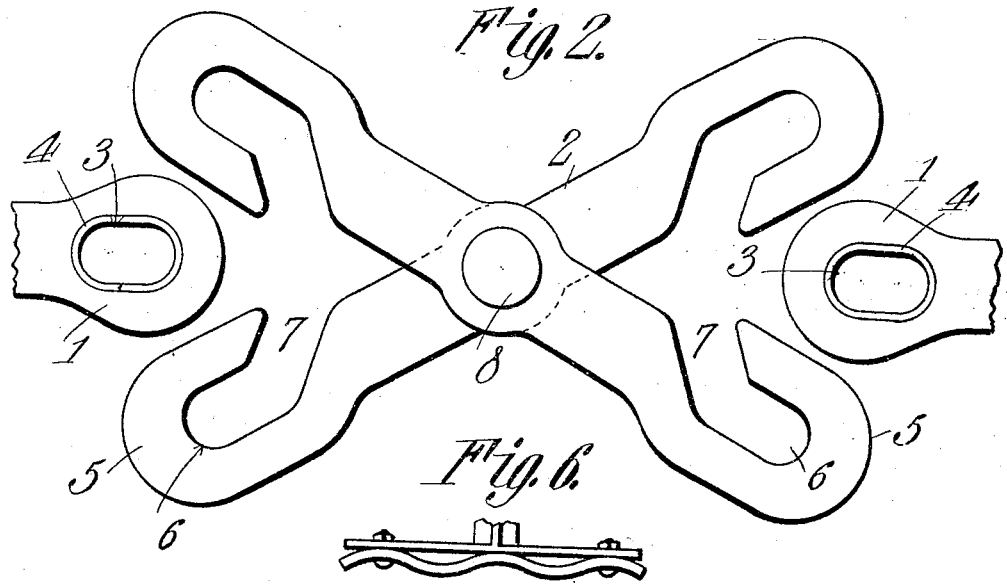
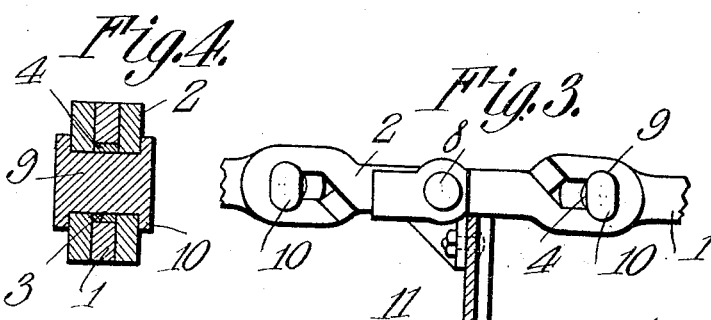
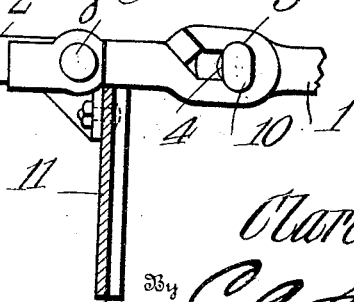
Witnesses
Inventor
Clarence W. Honabach
By C. A. Snow & Co.
Attorneys

UNITED STATES PATENT OFFICE.

CLARENCE W. HONABACH, OF EDWARDSVILLE, PENNSYLVANIA.

CONVEYER-CHAIN.

955,070.  Specification of Letters Patent.  Patented Apr. 12, 1910.

Application filed August 21, 1909. Serial No. 513,968.

*To all whom it may concern:*

Be it known that I, CLARENCE W. HONA-BACH, a citizen of the United States, residing at Edwardsville, in the county of Luzerne and State of Pennsylvania, have invented a new and useful Conveyer-Chain, of which the following is a specification.

This invention has reference to improvements in conveyer chains for bucket or blade conveyers and its object is to produce a chain wherein the links may be readily removed at will without the necessity of using tools, while the chain in use is effectually locked without danger of accidental disengagement of the links one from the other. Furthermore, the structure is such that there is practically no danger of the chain overriding the chain wheels on passing around the same.

In accordance with the present invention there are provided two types of links in the chain, one link being a double link and the other a single link, the double link comprising two members hinged or pivoted together at a central point so that the ends may be separated while the corresponding end of each single link is housed between two matching ends of a double link and is there held by a removable pivot pin which latter, however, locks in place when the links are in the active positions.

The invention will be best understood from a consideration of the following detail description taken in connection with the accompanying drawings forming a part of this specification, in which drawings—

Figure 1 is an elevation of a portion of a link chain with the links in connected or operative position. Fig. 2 is a similar view showing the links in the disconnected position. Fig. 3 is a side elevation partly in section, on a smaller scale than Figs. 1 and 2, showing one of the buckets attached to a link. Fig. 4 is a section on the line A—B of Fig. 1. Fig. 5 is a perspective view of one of the pivot pins. Fig. 6 is a plan view of one of the buckets or flights.

Referring to the drawings, there are shown single links 1 and double links 2, these links being arranged alternately. The showing of the drawing is confined to one type only of conveyer link but it will be understood that the invention is likewise applicable to other types of conveyer links and therefore the showing of the drawing is to be understood as more or less typical and as not confining the invention to the particular showing of links illustrated.

The links 1 are assumed to be of the same length as the links 2 and to be alike at the ends. At each end of each link 1 there is formed an eye 3 longer in the direction of the length of the link than it is wide transverse to the link. The purpose of this elongated eye will appear farther on. Since, as will hereinafter appear, the wear of the pin upon the links is mostly upon the single links 1, the eye 3 is provided with a bushing 4 which may be so applied as to be readily removable so that any wear of the links at this point may be remedied by the removal of the bushing and the insertion of a new bushing.

The double links 2 are made of two identical members each of which is formed at the end with oppositely disposed hooks 5 having an elongated eye portion 6 similar to the eye 3 of the link 1 and the mouth 7 of the hook opening is directed toward but at an angle to the central portion of the links. The two link members of each link 2 are connected at the center by a pivot pin 8, this connection being a permanent connection but permitting the movement of the link members about the pivot as an axis common to both so that the hook ends of the link member 2 may be brought into coincidence as shown in Fig. 1 or separated as shown in Fig. 2.

In order to connect the ends of the links together, that is, the end of a link 1 to the corresponding end of a link 2 there is provided a pivot or connecting pin 9 best shown in Fig. 5 where it will appear that the pin has on opposite ends heads 10 longer in one direction than in the other. Under these circumstances, a connecting pin 9 lodged in the two eyes 6 of the corresponding ends of the link 2 and in the eye 3 of a link 1 serves to connect the links against accidental separation while the heads 10 of the pins 9, which heads 10 are no wider than the diameter of the pins, prevent the escape of the pins from proper relation to the links. If now it be desired to remove a link, the links must be moved in a direction toward each other, the chain as a whole always having slack enough to permit this movement, and such movement is continued until the pin 9 is brought to the mouth 7 of the corresponding eyes 6 of the link sections of a link 2. Assuming that the links 1 have been moved toward the pivotal point 8 of a link 2 until both pins 9 are in the position stated, then the two members of the link 2 may be turned upon their pivot 8 until the hook ends have been disengaged from the pins 10 by causing the relative movement of these pins out through the mouths 7. Now the pin is free in each link 1 and the head 10 of the pin may be turned until longitudinal to the eye 3 and the latter is made of such size that the head 10 may be moved therethrough when the longitudinal axis of the head and the longitudinal axis of the eye are in coincidence. If the pin be worn, or if the bushing 4 be worn, then a new pin or bushing or both may be provided, or an entirely new link 1 may be introduced when a reversal of the operation described will cause the joining together of the links and a movement of the link 1 away from the pivot point 8 of the link 2 will cause the seating of the pin 9 in the outer ends of the eyes 6 and in the outer end of the eye 3, thus most effectually locking the links together against accidental displacement.

With a chain made up of links as described, any link that may need removal or replacement may be so removed without the aid of tools of any kind and a new link may be inserted with equal facility.

It is desirable that the pin 9 should not turn upon its longitudinal axis in the link 2 and for this purpose that portion of each pin 9 which engages in the corresponding portion of the eye 6 of the link 2 may be squared, or at least non-circular in shape so that the said pin may not turn in the link 2 and this non-circular portion is so related to the head 10 that when the pin is in the link 2 the heads 10 will traverse the eye 6. Between the squared portions the pin 9 may be circular in shape so that the eye 3 of the link 1 will conform therewith. Because of this circular portion of the pin intermediate of non-circular portions the link members 1 will turn upon the pin and so all wear which occurs in the chain will be between the bushing 4 and the pin 9, and each of these members may be readily replaced as may be found necessary.

Certain of the double links may carry flights or buckets, one of which latter is indicated at 11 in Figs. 3 and 6. These buckets are made corrugated, thus materially increasing their strength and at the same time, without increasing the weight, also increas-
ing the effective thickness of the buckets so that there is no danger of these flights or buckets finding their way into spaces or cracks in the conveyer trough.

What is claimed is:

1. A chain comprising alternate single link members and double link members, the single link members terminating in closed eyes and the double link members each composed of two like parts pivoted together intermediately and provided at the ends with open eyes, the openings in the eyes of one part being oppositely directed with relation to the openings in the eyes of the other part, and connecting pivot pins each traversing the open eyes at the end of a double link and the closed eye at the end of a single link.

2. In a conveyer chain, alternate double link members and single link members, the double link members each comprising two like parts pivoted together intermediately and having the ends provided with open eyes and there spaced apart in the direction of the axis of movement of the parts, and the single link members having eye ends adapted to be interposed between the eye ends of the double link members, and means for connecting the eye ends of the links together.

3. In a conveyer chain, alternate single link members and double link members, the said double link members each comprising two like parts pivoted together intermediately on an axis transverse to the length of the links, each of said parts of double link members having their ends provided with oppositely directed elongated open eyes, and the single link members having the ends provided with elongated closed eyes, and connecting pins each traversing the matching eyes at the end of a double link and the eye at the corresponding end of a single link.

4. In a conveyer chain, alternate single link members and double link members, the said double link members each comprising two like parts pivoted together intermediately and provided at the ends with open eyes, and the said single link members having at the ends elongated closed eyes, and connecting pins for the link members having elongated heads insertible through the elongated eyes in the single link members when the longer axis of the heads is coincident with the longer axis of the said eyes.

5. In a conveyer chain, alternate single link members and double link members, the said double link members each comprising two like parts pivoted together intermediately and provided at the ends with oppositely directed open eyes, the eyes at one part having the openings directed oppositely to those in the other part, and the said single link members having elongated closed eyes and connecting pins with elongated heads capable of passing through the elongated eyes in the single link members and locking over the eye ends of the double link members.

In testimony that I claim the foregoing as my own, I have hereto affixed my signature in the presence of two witnesses.

CLARENCE W. HONABACH.

Witnesses:
FRED. WILLIAMS,
CHAS. S. BRYANT.